US007304406B2

(12) United States Patent
Behringer

(10) Patent No.: US 7,304,406 B2
(45) Date of Patent: Dec. 4, 2007

(54) CONTROL DEVICE FOR SAFETY-CRITICAL COMPONENTS AND CORRESPONDING METHOD

(75) Inventor: Klaus Behringer, Igensdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/559,536

(22) PCT Filed: Apr. 3, 2004

(86) PCT No.: PCT/EP2004/003874

§ 371 (c)(1),
(2), (4) Date: Mar. 9, 2006

(87) PCT Pub. No.: WO2004/107377

PCT Pub. Date: Dec. 9, 2004

(65) Prior Publication Data

US 2006/0158794 A1 Jul. 20, 2006

(30) Foreign Application Priority Data

Jun. 3, 2003 (EP) ................................. 03012628

(51) Int. Cl.
*H02H 11/00* (2006.01)

(52) U.S. Cl. ...................................................... 307/326

(58) Field of Classification Search ................. 307/326
See application file for complete search history.

(56) References Cited

U.S. PATENT DOCUMENTS 4,665,323 A * 5/1987 Russell et al. ................ 307/75
6,397,280 B1 * 5/2002 Nitschke et al. ............ 710/110
6,515,377 B1 * 2/2003 Ubelein et al. ............ 307/10.1

FOREIGN PATENT DOCUMENTS

DE 44 09 541 A 9/1995
DE 100 09 707 A 9/2001

OTHER PUBLICATIONS

NOT-AUS-Schaltgeräte, Schutztürwächter, PNOZplus—Mastergerät PNOZXM1, Annoncement, Pilz, NSG-D-1-051-07/00, XP-000961973; Jul. 2000.

"Not-Aus-Schaltgeraete, Schutztuerwaechter" Announcement PILZ NSG-D-1-051-07/00, XX, XX, Jul. 2000.

* cited by examiner

*Primary Examiner*—Robert L. Deberadinis
(74) *Attorney, Agent, or Firm*—Harness, Dickey & Pierce

(57) ABSTRACT

The response time of safety-critical electrical components is improved during a safety cut-out. To this end, the outputs of two controllers used to control switches connected in series and pertaining to a switching device for the electrical components or machines to be switched are subjected to an AND operation. The transmission time from one controller to another is no longer relevant in terms of the safety cut-out, if one controller receives the cut-out signal from the input and the other controller is responsible for operating both switches in unison. The average response time during the safety cut-out increases accordingly.

10 Claims, 1 Drawing Sheet

CONTROL DEVICE FOR SAFETY-CRITICAL COMPONENTS AND CORRESPONDING METHOD

This application is the national phase under 35 U.S.C. § 371 of PCT International Application No. PCT/EP2004/003874 which has an International filing date of Apr. 13, 2004, which designated the United States of America and which claims priority on European Patent Application number EP 03012628.8 filed Jun. 3, 2003, the entire contents of which are hereby incorporated herein by reference.

FIELD

The present invention generally relates to a drive apparatus for open-loop or closed-loop control of a safety-critical component. The apparatus may include a switching device which has a first switch and a second switch, which is connected in series with the first, for switching the safety-critical component. A first control device may also be included for reception of an input signal and emission of a first drive signal, as well as a second control device for reception of the input signal and for emission of a second drive signal. The present invention also generally relates to a corresponding method for open-loop or closed-loop control of a safety-critical component.

BACKGROUND

Many safety applications require a very short reaction time for processing of an EMERGENCY-OFF demand. Although present-day modern safety appliances generally use microcontrollers and internal functions can therefore be processed very quickly, filter algorithms have to be used, because of burst and RF interference, in order to achieve the maximum availability. Further boundary effects such as compensation for the cable capacity and dynamic input testing in the end lead to relatively long evaluation times.

A drive apparatus which has two series-connected switches in order to satisfy the hardware redundancy requirement, with the switches each being electrically connected to their own microcontroller via a relay drive, is known from the report "Not-Aus-Schaltgeräte, Schutztürwächter [Emergency-off switching devices, guard door monitors] Announcement Pilz NSG-D-1-051-07/00, XX, XX, July 2000 (2000-07), pages 1 to 4, XP 000961973". One input of each of the microcontrollers is electrically connected to an emergency-off switch, and they are formed alongside one another, with equal authority. The switches can each be controlled via the associated microcontroller. The switches are controlled as a function of the need to switch off a safety-critical component.

Furthermore, a safety device in which a sensor apparatus is electrically connected to two evaluation devices is known from German Laid Open Specification DE 44 09 541 A1. One output of each evaluation unit is electrically connected to a switch which is in the form of an auxiliary contactor. A timer is arranged in the signal path between one evaluation unit and one auxiliary contactor, by which timer it is possible to switch off a downstream main circuit via the auxiliary contactor, with a delay.

A further problem is represented by the fact that, in safety appliances from Category SIL3 with respect to the European IEC Standard 615 08, two controllers must always be used for hardware redundancy and fault tolerance reasons.

The applicant has solved this problem, in the case of safety appliances, by using two controllers with identical hardware and identical firmware for safety appliances. A "master/slave principle" is used in order to make it possible to identify systematic faults. Thus, one of the controllers is in each case the master for a short time, while the other is the slave. The two controllers interchange this status after a defined time. One of the controllers is normally used to drive specific switches, for example in a load circuit on an electrical machine while, in contrast, the other controller is used to monitor the switching states of these switches, and itself drives other switches of other components.

That controller which is in the master mode reads all of the inputs and defines the output states of the switches to which it is connected or which are allocated to it. Important states such as demands are matched with the slave, and internal tests are carried out.

An EMERGENCY-OFF demand is first of all registered by the controller in the master mode. One disadvantage in this case is that those outputs which are driven by the controller in the slave mode cannot be switched off until the EMERGENCY-OFF demand has been transmitted from the master to the slave. Those outputs which are driven directly by the master can be switched off relatively quickly. The reaction time for switching off the driven components is thus dependent on which controller receives the demand first of all, and whether the desired output can also be switched off by this controller.

Demand times of less than 45 milliseconds have not been possible to achieve until now with the described circuit design. Correspondingly faster hardware would allow the demand time to be reduced down to 35 milliseconds. However, this is not sufficient for critical demands such as press controls.

SUMMARY

An object of at least one embodiment of the present invention is thus to propose a drive apparatus and/or a corresponding method for open-loop or closed-loop control of a safety-critical component, whose reaction time is shortened on average.

According to at least one embodiment of the invention, an object may be achieved by a drive apparatus for open-loop or closed-loop control of a safety-critical component having a switching device which has a first switch and a second switch, which is connected in series with the first, for switching the safety-critical component, a first control device for reception of an input signal and emission of a first drive signal, and a second control device for reception of the input signal and for emission of a second drive signal, wherein the first switch in the switching device can be driven by the first control device and the second switch in the switching device can be driven by the second control device. The first and the second switch are driven with a time-offset with respect to one another. Furthermore, the first and the second control device operate on the master/slave principle, thus resulting in a defined time offset.

At least one embodiment of the invention also provides a method for open-loop or closed-loop control of a safety-critical component by provision of a switching device which has a first switch and a second switch, which is connected in series with the first, for switching the safety-critical component, provision of a first control device, which is connected to the switch, and of a second control device which is connected to the second switch, reception of an input signal and emission of a first drive signal from the first control device to the first switch in the switching device on the basis of the input signal, wherein the second control device emits a second drive signal to the second switch in the switching device on the basis of the input signal.

At least one embodiment of the invention is based on the idea that the output should be switched off irrespective of which of the switches is turned off first all. Since both controllers or control devices now drive the series circuit including the two switches and this results in the outputs of the controllers being AND-linked, the output to the switching device is switched off in all cases with the shorter reaction time of the two controllers.

One positive side-effect of this time-offset switching is that simultaneous welding of the two switches, for example contactors, can be precluded. The EMERGENCY-OFF function is thus still ensured even after welding of one of the contacts of the switches.

The time-offset switching-off of the switches also has the advantage that approximately the same life can be expected of both switches. This is because each switch is switched off with equal frequency, statistically on average, with and without current flowing through it.

The first and the second switch in the switching device are preferably each formed by a relay or a contactor. Alternatively, the first and the second switch may, however, also be in the form of semiconductor switches or may include an optocoupler.

The time offset is then, specifically, governed by the time period which the master requires in order to make the slave aware of an event.

An electrical machine with a load circuit is advantageously equipped with the said drive apparatus according to at least one embodiment of the invention. In this case, the drive apparatus may be used in particular for safety disconnection or EMERGENCY-OFF control.

BRIEF DESCRIPTION OF THE DRAWINGS

Embodiments of the present invention will now be explained in more detail with reference to the attached drawings, in which.

DETAILED DESCRIPTION OF THE EXAMPLE EMBODIMENTS

Figure 1:
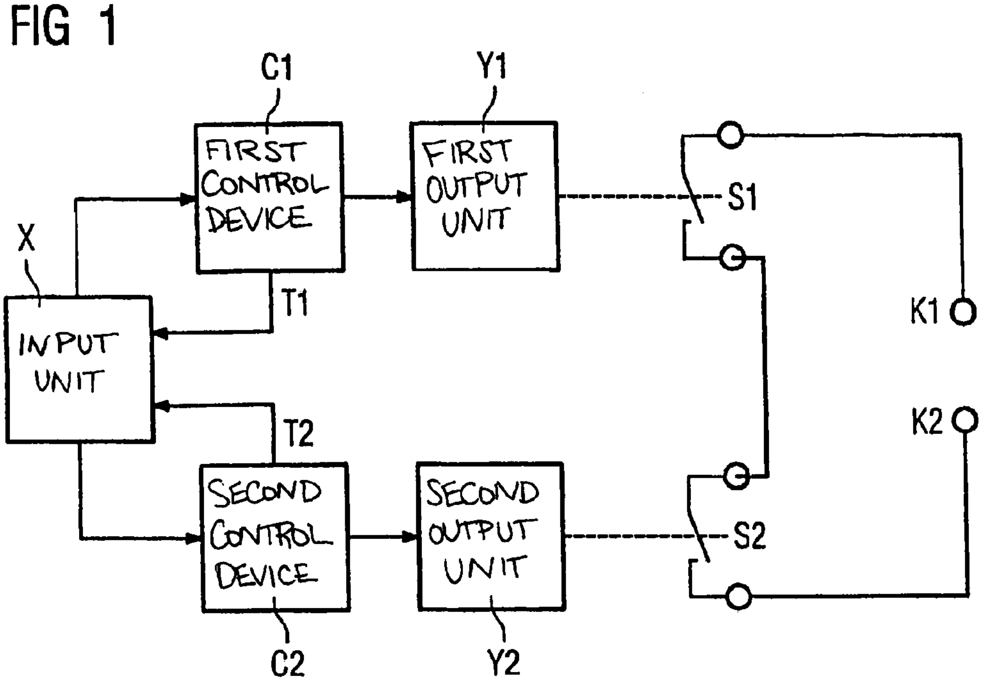
FIG. 1 shows a circuit diagram of a drive apparatus according to at least one embodiment of the invention.

The example embodiments described in the following text represent preferred embodiments of the present invention. Two contactors S1 and S2 are used in the circuit diagram shown in FIG. 1 and are connected in series with one another in order to switch a load circuit, which is not illustrated, of an electrical machine via the terminals K1 and K2. Two control devices or controllers C1 and C2 are used to drive the two contactors S1 and S2. The output signals from the controllers C1 and C2 are converted by the respective output units Y1 and Y2 into corresponding movements of the contactors S1 and S2. The two controllers C1 and C2 receive their input signal from an input unit X which, for example, may be in the form of an EMERGENCY-OFF switch. This input signal is checked by respective clock signals T1 and T2 at the input X of the controllers C1 and C2.

Figure 2:
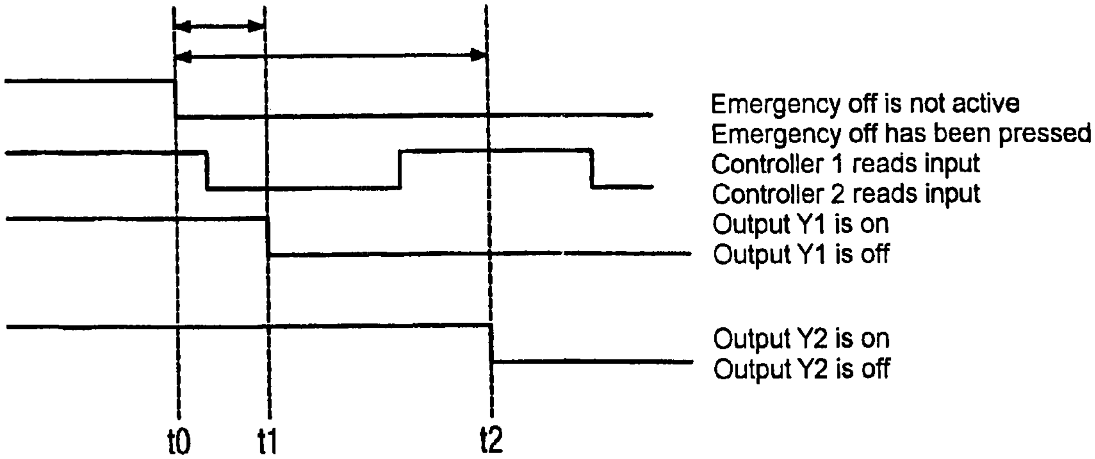
FIG. 2 shows a time signal diagram of the drive apparatus shown in FIG. 1.

FIG. 2 shows a signal waveform diagram or state diagram of the individual components for this purpose. The EMERGENCY-OFF switch at the input X is pressed at the time t0. The controller C1 reads the input X at this time. After a certain reaction time, the output unit Y1 is switched off at the time t1. Since the controller C2 was not active at the time t0, it must first of all be informed by the controller C1 that the EMERGENCY-OFF switch has been pressed, in order to switch off the output unit Y2. The reaction time is thus correspondingly longer, and the output unit Y2 is not switched off until the time t2.

In one specific example embodiment, the drive apparatus according to at least one embodiment of the invention may be used in a safety appliance, for example the 3TK2845 model series from the applicant, with two floating relay outputs, which are connected in series. The reaction time of the master to an EMERGENCY-OFF demand is typically up to 8 milliseconds. The time to transmit the EMERGENCY-OFF demand from the master to the slave may be up to 15 milliseconds.

In the present example embodiment, the maximum tripping time for the relay is 12 milliseconds. With the standard circuitry according to the prior art, in which relays connected in series are driven only with the aid of one controller the reaction time would be up to 8 ms+15 ms+12 ms=35 ms. With the circuitry according to the invention, with a so-called "cascaded output", the reaction time would be at most 8 ms+12 ms=20 ms since each controller C1, C2 switches one of the relays or one of the contactors S1, S2 so that there is no longer any need to transmit the EMERGENCY-OFF demand to the slave in order to switch off the load circuit.

The demands are thus satisfied even for very time-critical applications. The relays or contactors S1, S2, which are connected in the form of a logic AND link, in the switching device when driven according to the invention can still make use of the appliances which have been used in the past without any need for changes in the hardware or firmware for a safety disconnection.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A drive apparatus for at least one of open-loop and closed-loop control of a safety-critical component, comprising:

a switching device including a first switch and a second switch, connected in series with the first, for switching the safety-critical component;

a first control device for reception of an input signal and emission of a first drive signal; and a second control device for reception of the input signal and for emission of a second drive signal, wherein the first switch in the switching device is drivable by the first control device and the second switch in the switching device is drivable by the second control device, wherein the first switch and the second switch are drivable with a time offset with respect to one another, and wherein the first and the second control device operate on the master/slave principle.

2. The drive apparatus as claimed in claim 1, wherein the first and the second switch are in each case a relay or a contactor.

3. The drive apparatus as claimed in claim 1, wherein the first and the second switch are in each case a semiconductor switch.

4. The drive apparatus as claimed in claim 1, wherein the first and the second switch in each case comprise an optocoupler.

5. An electrical machine having a load circuit and a drive apparatus as claimed in claim 1.

6. The electrical machine as claimed in claim 5, further comprising an emergency-off switch for supplying the input signal.

7. A method for at least one of open-loop and closed-loop control of a safety-critical component, the method comprising:

provisioning a switching device including a first switch and a second switch, connected in series with the first, for switching the safety-critical component;

provisioning a first control device, connected to the switch, and of a second control device connected to the second switch;

receiving an input signal;

emitting a first drive signal from the first control device to the first switch in the switching device on the basis of the input signal; and emitting a second drive signal from the second control device to the second switch in the switching device on the basis of the input signal, wherein the first and the second drive signal are emitted with a time offset with respect to one another, and wherein the first and the second drive signal are produced using a master/slave process as a function of the input signal, thus resulting in the defined time offset.

8. The method as claimed in claim 7, wherein the switching device is used to switch a load circuit of an electrical machine.

9. The method as claimed in claim 7, wherein the input signal is produced by an emergency-off switch.

10. The method as claimed in claim 8, wherein the input signal is produced by an emergency-off switch.

* * * * *